United States Patent
Sallas et al.

(10) Patent No.: US 9,405,726 B2
(45) Date of Patent: Aug. 2, 2016

(54) SEISMIC SOURCE AND METHOD FOR INTERMODULATION MITIGATION

(71) Applicant: CGGVERITAS SERVICES SA, Massy (FR)

(72) Inventors: John Sallas, Plano, TX (US); Kaelig Castor, Paris (FR)

(73) Assignee: CGG SERVICES SA, Massy (FR)

( * ) Notice: Subject to any disclaimer, the term of this patent is extended or adjusted under 35 U.S.C. 154(b) by 672 days.

(21) Appl. No.: 13/836,499

(22) Filed: Mar. 15, 2013

(65) Prior Publication Data

US 2014/0114578 A1    Apr. 24, 2014

Related U.S. Application Data

(60) Provisional application No. 61/716,110, filed on Oct. 19, 2012.

(51) Int. Cl.
*G01V 1/37* (2006.01)
*G06F 17/00* (2006.01)
*G01V 1/00* (2006.01)

(52) U.S. Cl.
CPC ............... *G06F 17/00* (2013.01); *G01V 1/005* (2013.01); *G01V 1/37* (2013.01); *G01V 2210/1214* (2013.01); *G01V 2210/324* (2013.01)

(58) Field of Classification Search
CPC .......... G06F 17/00; G01V 1/37; G01V 1/005; G01V 2210/1214; G01V 2210/324
USPC .......................................................... 702/17
See application file for complete search history.

(56) References Cited

U.S. PATENT DOCUMENTS

| | | | |
|---|---|---|---|
| 4,346,461 A * | 8/1982 | Muir | G01V 1/247 367/100 |
| 5,550,786 A | 8/1996 | Allen | |
| 5,719,823 A | 2/1998 | Earp | |
| 5,815,465 A | 9/1998 | Turgut | |
| 6,161,076 A | 12/2000 | Barr et al. | |
| 7,859,945 B2 | 12/2010 | Sallas et al. | |
| 2004/0174770 A1 | 9/2004 | Rees | |
| 2006/0250891 A1 | 11/2006 | Krohn | |
| 2009/0010103 A1* | 1/2009 | Sallas | G01V 1/005 367/41 |
| 2010/0114495 A1 | 5/2010 | Al-Saleh | |
| 2010/0195434 A1 | 8/2010 | Menger et al. | |

OTHER PUBLICATIONS

John J. Sallas, :How do hydraulic vibrators work? A look inside the black box, Geophysical Prospecting, vol. 58, Issue 1, Jan. 2010, pp. 3-17.

\* cited by examiner

*Primary Examiner* — Bryan Bui
(74) *Attorney, Agent, or Firm* — Patent Portfolio Builders PLLC

(57) ABSTRACT

A method for calculating intermodulation noise generated with one or more land seismic sources. The method includes receiving seismic data generated by actuating the one or more land seismic source with a first sweep and a second sweep; calculating with a computing device a first earth response corresponding to the first sweep; calculating with the computing device a second earth response corresponding to the second sweep; and calculating the intermodulation noise based on the first and second earth responses. The second sweep is a time reverse sweep of the first sweep.

20 Claims, 7 Drawing Sheets

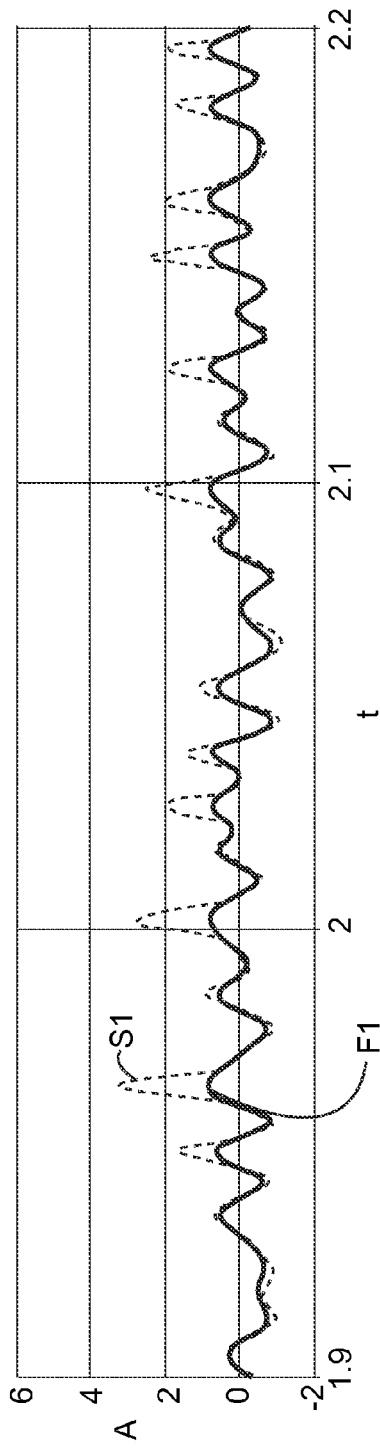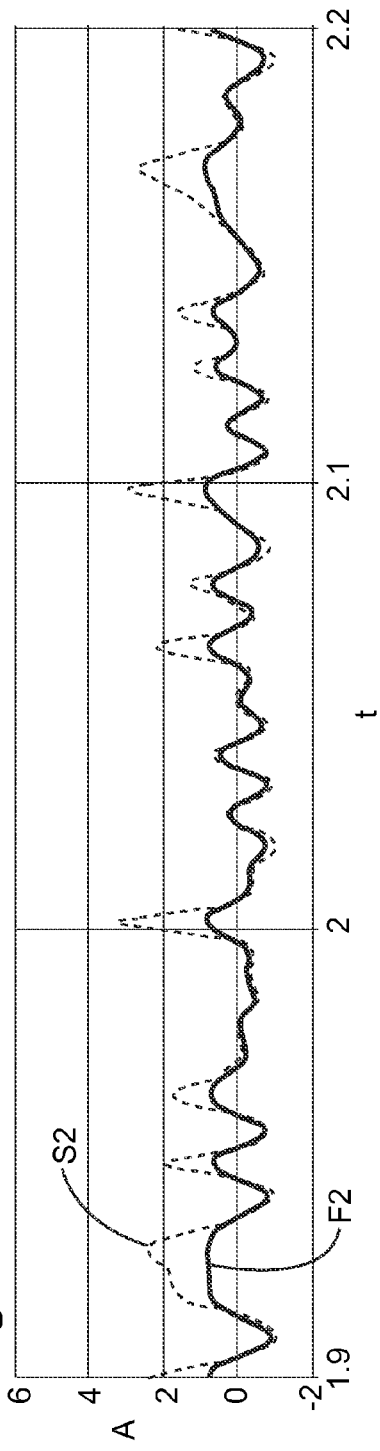

SEISMIC SOURCE AND METHOD FOR INTERMODULATION MITIGATION

BACKGROUND

1. Technical Field

Embodiments of the subject matter disclosed herein generally relate to methods and systems for generating seismic waves and the mitigation of seismic noise artifacts due to intermodulation distortion (IMD) that may be present in the recorded data.

2. Discussion of the Background

Land seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine whether the oil and gas reservoirs are located.

Geophysical prospectors generate seismic waves in order to probe the subsurface (e.g., for imaging the earth). These acoustic waves may be generated from an explosive, implosive, impulsive, or a vibratory source executing swept-frequency (chirp) or random sequence. A recording of the acoustic reflection and refraction wavefronts that travel from the source to a receiver are used to produce a seismic field record. Variations in the travel times of the reflection events in these field records indicate the position of reflection and/or refraction surfaces within the earth.

IMD distortion results from the modulation of signals containing two or more different frequencies in a non-linear system. The non-linear system of particular concern is the earth coupling and the two or more different frequencies may be (i) the frequency emitted by the source and (ii) harmonics of the same frequency. The intermodulation between each frequency component will form additional signals at frequencies that are not just at harmonic frequencies (integer multiples) of either, but also at the sum and difference frequencies of the original frequencies. There are other nonlinear mechanisms in the vibrator itself that produce IMD distortion products, but since these effects are included in the measured ground force signal, they are incorporated into the source signature signal so that their distortion artifacts can be mitigated directly by performing a source signature deconvolution as a data processing step.

A swept-frequency or chirp type seismic source may use a long pilot signal such as 2 to 64 seconds to ensure sufficient energy is imparted to the earth. With a swept frequency type source, the energy is emitted in the form of a sweep of regularly increasing (upsweep) or decreasing (downsweep) frequency in the seismic frequency range. The vibrations of the source are controlled by a control system, which can control the frequency and phase of the seismic signals. These sources are low energy and, thus, this causes noise problems that may affect the recorded seismic data. For example, the source generated harmonic energy may be an additional source of energy manifesting as noise, distortion or interference with recorded data. Generally for chirps, the source emits only one frequency at a time and its harmonics, so nonlinear coupling effects in the earth will result in noise that is indistinguishable from harmonic noise. With vibrator rocking, usually front to back or side to side, sub-harmonic energy can also be produced and any IMD products between sub-harmonics, fundamental or harmonics are also indistinguishable from sub-harmonic noise and its multiples. One exception is due to amplitude tapers that are generally applied at the start and end of a chirp. The taper intervals are usually between 100 to 1000 ms in duration. During the amplitude taper at the beginning or end of a chirp, the reference contains more than one frequency due to the amplitude modulation of the chirp signal. Thus, there is some potential for IMD production during taper intervals since more than two frequencies, which are not harmonics or sub-harmonics of one another, are simultaneously generated and when the vibrator output signal enters the nonlinear coupling, IMD seismic waves are emitted in addition to fundamental, harmonic and sub-harmonic waves.

A bigger problem is in the case when pseudorandom sequences are employed. The temporal frequency content of random signals is rich in spectral diversity, i.e., many frequencies are generated simultaneously. Thus, the potential for IMD noise interference in seismic records is much greater when pseudorandom sequences are used. In correlated shot records, the IMD noise is most evident on near offset traces (these correspond to receivers close to a vibrator). The IMD noise that is seen in correlated shot gathers is primarily linked to strong arrival events like first break events and surface waves.

Therefore, there are instances when vibratory sources may generate harmonics, sub-harmonics and IMD noise which can cross-feed with signals from other sources, giving misleading results when the signals are processed to separate the signals from each source. In addition, the harmonics are a source of noise that can mask weak reflection signals from deeper layers.

Currently, for reducing the seismic survey time, multiple sources are deployed at close locations and are actuated simultaneously, thus, reducing the time necessary to complete the survey. However, using multiple sources at the same time only increase the IMD noise. Multiple sources may be used if some means for distinguishing between signals emanating from the different sources can be provided. There are various methods for reducing the harmonic noise and cross-feed but none is capable of addressing related noises, e.g., subharmonic and/or IMD noise.

Thus, there is a need to develop a method, a source and/or a seismic survey system that is capable of imparting energy to the earth in such a way that IMD noise may be mitigated.

SUMMARY

According to an exemplary embodiment, there is a method for calculating intermodulation noise generated with one or more land seismic sources. The method includes a step of receiving seismic data generated by actuating the one or more land seismic source with a first sweep and a second sweep; a step of calculating with a computing device a first earth response ($h1est$) corresponding to the first sweep; a step of calculating with the computing device a second earth response ($h2est$) corresponding to the second sweep; and a step of calculating the intermodulation noise (IMD) based on the first and second earth responses ($h1est$, $h2est$). The second sweep is a time reverse sweep of the first sweep.

According to still another exemplary embodiment, there is a computing device for calculating intermodulation noise generated with one or more land seismic sources. The computing device includes an interface for receiving seismic data generated by actuating the one or more land seismic source with a first sweep and a second sweep; and a processor connected to the interface. The processor is configured to calculate a first earth response ($h1est$) corresponding to the first sweep, calculate a second earth response ($h2est$) corresponding to the second sweep, and calculate the intermodulation noise (IMD) based on the first and second earth responses (h1est, h2est). The second sweep is a time reverse sweep of the first sweep.

According to still another exemplary embodiment, there is a non-transitory computer readable medium including computer executable instructions, wherein the instructions, when executed by a computer, implement the method noted above.

BRIEF DESCRIPTION OF THE DRAWINGS

For a more complete understanding of the present invention, reference is now made to the following descriptions taken in conjunction with the accompanying drawings, in which:

FIG. 2 is a graph illustrating a first measured force and a first pilot signal for a source driven by a first sweep according to an exemplary embodiment;

FIG. 3 is a graph illustrating a second measured force and a second pilot signal for a source driven by a second sweep, which is the reverse of the first sweep, according to an exemplary embodiment;

DETAILED DESCRIPTION OF THE INVENTION

Figure 1:
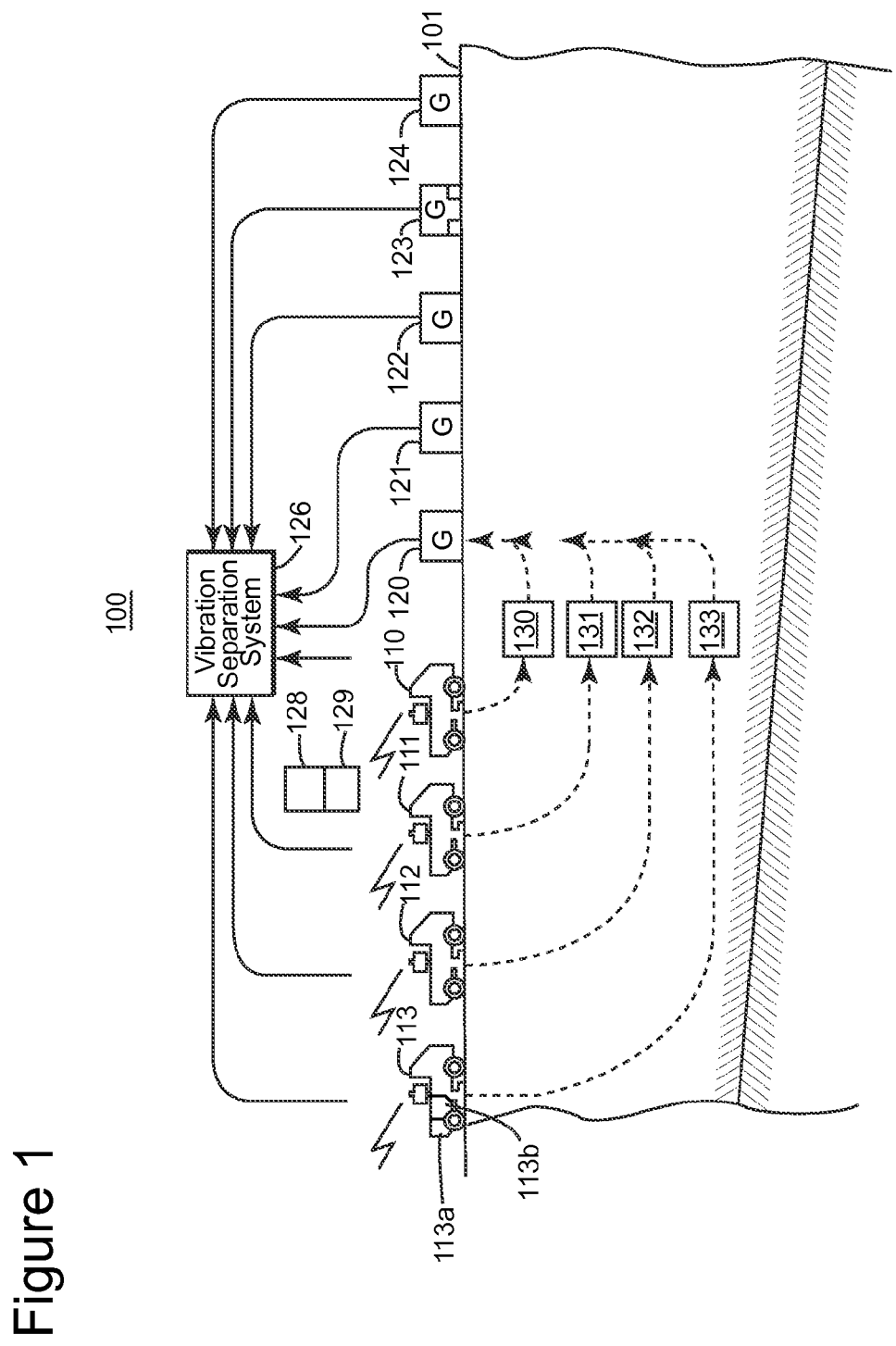
FIG. 1 illustrates a field seismic survey according to an exemplary embodiment.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system. However, the embodiments to be discussed next are not limited to a land seismic system but they may be applied to marine seismic sources as well.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a method for operating a vibratory source with two different pilot signals that are used alternately to drive the source is described. The second pilot signal may be a time-reversed version of the first pilot signal. In this way, the IMD noise that occurs in negative time for one sweep can be used to predict IMD noise in the positive time for the other sweep and vice versa. The pilot signals may be a traditional sweep signal, e.g., a sine function, or a pseudo-random sweep, as discussed, for example, in U.S. Pat. No. 7,859,945 (herein '945), the entire content of which is incorporated herein by reference.

Before discussing in more detail the above-noted method and associated source, a land seismic system 100 that generates and also collects seismic data is discussed with reference to FIG. 1. Consider the configuration of a system 100 for land generating and collecting seismic data. The exemplary survey system 100 includes four vibrators 110, 111, 112, and 113 placed at the surface of the earth 101. Vibrators 110, 111, 112, and 113 may be conventional truck-mounted vertical P-wave vibrators; however, it is understood that other vibrators, such as horizontal shear-wave vibrators, may be utilized or even a mixture of both P-wave and shear wave vibrators. The deployment of the vibrators may vary widely depending upon the survey requirements. For example, for a 3-D survey the vibrators may be spaced far apart and not collinear with one another.

Each vibrator may be equipped with a sweep generator module and control system electronics. For example, FIG. 1 shows vibrator 113 having the sweep generator module 113a and the control system electronics 113b. After receiving a start command, for example, initiated via a telemetry link with the recording system or by the operator of the vibrator, each vibrator begins sweeping. As discussed above, the vibrators are not coordinated to sweep simultaneously, which is different from many existing methods. However, in one application, the vibrators are coordinated to sweep simultaneously. Each vibrator sweep generator may be loaded with a unique pilot signal. In one application, the vibrator sweep generator receives its corresponding pilot signal from a central controller 129. Thus, the pilot signal may be generated locally or centrally.

Sensors (not shown) attached to vibrators 110, 111, 112, and 113 are connected to a vibrator separation system 126. The sensors can be motion sensors, such as accelerometers mounted to the reaction mass, the base plate of the vibrator, or the earth immediately adjacent to the vibrator, a transducer or combination of transducers configured to measure the differential pressure in the actuation chamber of the vibrator, a load cell attached to the bottom of the base plate for measurement of the ground force (contact force), or a weighted sum of the base plate and the reaction mass accelerometers useful for estimating the ground force. Additionally, the sensor could comprise strain gauges mounted on the driven structure of the vibrator to provide an estimate of the ground force. Thus, these sensors provide the ground force signals to the vibrator separation system 126.

Alternatively, (i) the pilot or reference signal generated by the vibrator controller that the vibrator output follows or (ii) a Kalman filter estimate of the ground force provided by the vibrator controller (e.g., available from Sercel, Inc., Houston, Tex.) can be utilized for the sensor movement or (iii) another signal that is representative of the signal imparted into the earth, for example the base plate accelerometer signal. The sensor measurement, or some filtered version of the sensor measurement, is the measured signal and represents the actual source vibration imparted to the earth by the vibrator. In this respect, it is noted that while the vibrator follows a pilot signal, the output of the vibrator (the sweep) may be different from the pilot signal. The measured signals may be transmitted to a recording system 128 by hardwired link, a radio telemetry link, or by a separate acquisition system that records and stores the measured signals so that the measured signals can be integrated with the acquired seismic data set at a later time. The recording system 128 may be implemented in the same hardware as the central controller 129.

Receiver sensors, geophones for example, 120, 121, 122, 123, and 124 are positioned at the surface of the earth 101 in the survey region at locations displaced from the vibrator position. The receiver sensors may be conventional moving coil type geophones, Micro Electro-Mechanical System (MEMS) sensor elements, or hydrophones for transition zone areas like marshes. In some areas, a receiver sensor may include a group of receiver sensors arranged as a receiver array to help attenuate ground roll or other noise modes. Receiver sensors are not limited to vertical component type sensors; horizontal geophones and 3-C geophones/accelerometers may also be used depending upon the nature of the survey to be conducted. For simplicity, receivers 120, 121, 122, 123, and 124 will be considered single component vertical geophones configured to function as point receivers in this embodiment.

As shown in FIG. 1, vibratory energy radiated by each vibrator 110, 111, 112, and 113 travels through the earth from each vibrator to the receiver sensors 120, 121, 122, 123, and 124 in the survey area. The vibratory signal received by each receiver sensor will actually be a composite signal comprised of contributions from each vibratory source. Transfer functions 130, 131, 132, and 133 represent the transmission path response from vibrator 110, 111, 112, and 113 to receiver sensor 120 respectively. The transfer function will depend upon the vibratory signal radiated by each vibrator, the refraction and reflection by the subterranean formations of the vibratory source energy, and the response of the receiver sensor. Subsequent processing steps can be used to remove the embedded response due to the choice of source measured signal and receiver response.

The method for mitigating the IMD noise is now discussed. It is noted that IMD noise is mainly associated with random sweeps. The method discussed next can also be applied to non-random sweeps, for example, traditional sine sweeps, by replacing the IMD noise term with a harmonic distortion noise term "Dist." Thus, the exemplary embodiments discussed next exemplify the IMD noise but the same embodiments can be applied to other distortion models. Considering in one embodiment that the IMD noise refers to an additive noise that corresponds to a difference between a measured force $f_1(t)$ and a real source $s_1(t)$ representing the actual propagated signal, an equation describing a relation between the measured seismic data $g_1(t)$ and the real source $s_1(t)$ is as follows, where "$\otimes$" represents the convolution operator in the time domain:

$$g_1(t)=s_1(t)\otimes h(t)=f_1(t)\otimes h(t)+imd_1(t)\otimes h(t) \quad (1).$$

The force $f_1(t)$ is measured, for example, with a sensor located at the vibrator, the IMD noise $imd_1$ is calculated, and the real source $s_1(t)$ is the real seismic signal radiated into the earth in response to the applied force. $h(t)$ is the real transfer function (response) of the earth (it cannot be measured exactly because noise is always present), and $g_1(t)$ is the seismic data recorded with the seismic recorders shown in FIG. 1. Although FIG. 1 shows plural sources, the method now discussed can be applied to a single seismic source. However, the method may also be applied to plural sources as shown in FIG. 1. It is noted that for an ideal case, the force $f_1(t)$ may be considered to be identical to the pilot signal applied to the source. For this reason, this document refers interchangeably to the (measured) force and the pilot signal as $f_1(t)$. The same is true for the time-reversed version of $f_1$, which is $f_2$.

For the time-reversed pilot signal $f_2$, the equation describing a relation between the measured seismic data $g_2(t)$ and the real source $s_2(t)$ is as follows:

$$g_2(t)=s_2(t)\otimes h(t)=f_2(t)\otimes h(t)+imd_2(t)\otimes h(t) \quad (2).$$

It is noted that both equations (1) and (2) are written in the time domain. In one application, both equations can be transformed into the frequency domain. In another application, the equations can be transformed into another domain, e.g., tau-p domain. For the frequency domain, it is noted that Fourier transforms (F{ }) for real sequences $x(t)$ and $x(-t)$ are:

$$F\{x(t)\}=X(f), \text{ and}$$

$$F\{x(-t)\}=X(f)^*$$

where $X$ is the Fourier transform of $x$, mathematical operation "*" is the complex conjugate operation and "f" is the frequency. In one embodiment, the source forward pilot signal record "$f_1(t)$" may be defined as follows: $f_1(t)$ has a record length of "T" where the source signal is active from time interval[0, SL], where "SL" is the sweep length followed by a sequence of zero values over the time interval [SL, T] and define the listen time "LT" as LT=T−SL. The source reverse pilot signal record "$f_2(t)$" may be defined in such a way that $f_2(t)$ also has a record length of T, where the source signal is active from time interval[0, SL] followed by a sequence of zero values over the time interval [SL, T]; however, the values of $f_2(t)$ over the interval[0, SL] are time reversed with respect to $f_1(t)$, i.e. $f_1(t)=f_2(SL-t)$ for $0 \leq t \leq SL$. In the frequency domain:

$$F\{f_1(t)\}=F1(f) \text{ and}$$

$$F\{f_2(t)\}=F2(f),$$

with the result that: $F2(f)=F1(f)^* e^{-j2\pi fSL}$, where the term "$e^{-j2\pi fSL}$" will be recognized as a frequency domain representation of a time shift operator with the term "j" being defined as $j=(-1)^{1/2}$. The term "$e^{-j2\pi fSL}$" in effect applies a time delay equal to the sweep length SL.

In one embodiment, a simple earth response in the frequency domain may be assumed to have the following form:

$$H(f)=\{1000(j2\pi f)/[(j2\pi f+1000)(j2\pi+3000)]\}(e^{-j2\pi f\theta 1}+0.25e^{-j2\pi f\theta 2}) \quad (3),$$

where "$\theta 1$" and "$\theta 2$" are time delays corresponding to arrival times of seismic waves from different travel paths propagating from the source to the geophone receiver. Note that the earth response is causal, i.e., source seismic waves are not received prior to their emission. For the noise free, linear case, it is possible to describe a received signal "$g(t)$" as the source signal "$f(t)$" convolved with earth response "$h(t)$". In the frequency domain, using capitalization and "f" to denote the Fourier transformed signals:

$$G(f)=H(f)F(f) \quad (3a)$$

If some IMD noise is created by some nonlinear mechanism at the source, but not present in $f(t)$, for example, due to soil nonlinearity near the contact area between the vibrator baseplate and the earth surface, then:

$$G(f)=H(f)[F(f)+IMD(f)] \quad (3b)$$

Thus, an estimate of the earth response can be made using the available measured signals by defining:

$$Hest(f)=G(f)/F(f), \quad (3d)$$

where Hest is an estimate of a Fourier transform of the real earth response h. Therefore:

$$Hest(f)=H(f)+(IMD(f)H(f))/F(f). \quad (3e)$$

Note, one technique often used to stabilize spectral division to handle the case where F(f) may have spectral zeroes is to modify the equation above as follows, where $\epsilon$ is a small number:

$$\text{Hest}(f) = G(f)F(f)^* / [F(f)F(f)^* + \epsilon] \quad (3f)$$

In other words, the estimated earth response (or transfer function) may be calculated by deconvolution, i.e., spectral division of the seismic traces with the measured force. The deconvolution may be performed in the frequency domain. Thus, having the received signal $g_1$ for the forward sequence and the received signal $g_2$ for the reverse sequence, equations (1) and (2) can now be solved (deconvolution) based on equation (3f), to determine the estimated earth responses H1est and H2est:

$$H1est_f := \frac{G1_f \cdot \overline{F1_f}}{F1_f \cdot \overline{F1_f} + \varepsilon}, \quad (4)$$

and $$H2est_f := \frac{G2_f \cdot \overline{F2_f}}{F2_f \cdot \overline{F2_f} + \varepsilon}, \quad (5)$$

where the subindex "f" indicates that those quantities are in the frequency domain and a bar in top of force F1 or F2 means complex conjugate respectively for the forward "F1" or reverse "F2" force signals. Because the source and receiver signals are sampled and digitized by the data acquisition system, a fast fourier transform (FFT) may be used to compute the frequency domain representations of the source signals and subindex "f" also serves as a digital frequency index. Thus, equation (4) can be evaluated at each digital frequency to form an array of values corresponding to an FFT of H1est and then IFFT (inverse fast fourier transform) can be taken to compute the time domain earth response estimate h1est. The same applies to equation (5) to form the time domain estimate h2est.

Having the estimated values h1est and h2est, the measured values f1 and f2, and the measured seismic data $g_1$ and $g_2$, it is now possible to determine the $\text{imd}_1$ and $\text{imd}_2$ noises and to use them to create an estimate of s1 and s2, the true source signals that radiate from the source and thus, in subsequent steps, to use s1 and s2 instead of f1 and f2 to form a better estimate of the earth response. In one application, the $\text{IMD1}_f$ is equal to $\text{IMD2}_f^* e^{-j2\pi f SL}$ because $\text{F1}_f$ is equal to $\text{F2}_f^* e^{-j2\pi f SL}$. For this to happen, it is desirable that the vibrator is well controlled so that the forward and reverse force signals are exactly the time reverse of one another, and that the nonlinear mechanism responsible for IMD production is well-behaved and repeatable. In practice, these assumptions may not hold true, but the real conditions may be close enough for IMD mitigation to be achieved.

As noted above, because the earth has a causal response, nothing should precede the first arrival in its time domain response. The implication of this is that IMD noise that trails early arrivals in hest1(t) and can mask weaker reflection events from deep targets that might follow can be estimated using the IMD noise that precedes the first arrival in earth response estimate hest2(t). The converse also holds true, so that IMD noise in negative time from hest1(t) can be used to estimate IMD noise in hest2(t). Because imd1 and imd2 should be flipped versions of one another, this information too can be exploited to further improve their overall estimates, thereby further enabling this embodiment to form s1 and s2.

FIG. 2 illustrates the measured force $f_1$ and the real source signal $s_1$, which is the IMD corrupted signal radiated by the source when activated with the first pilot signal. FIG. 3 illustrates the measured force $f_2$ and the real source signal $s_2$, which is the IMD corrupted signal radiated by the source when activated with the second pilot signal. It is noted that the quantities shown in FIGS. 2 and 3 are synthetic values. The earth response (h1est) for the measured force $f_1$ is illustrated by curve 400 and the same response from which the noise has been removed (based on the method discussed above) is illustrated by curve 402 in FIG. 4. It is noted that the IMD noise artifacts 400a and 400b are removed in curve 402. The earth response (h2est) of the measured force $f_2$ is illustrated by curve 502 and the same response from which the noise has been removed (based on the method discussed above) is illustrated by curve 502 in FIG. 5. It is noted that the IMD noise artifacts 500a and 500b are removed in curve 502.

Figure 4:
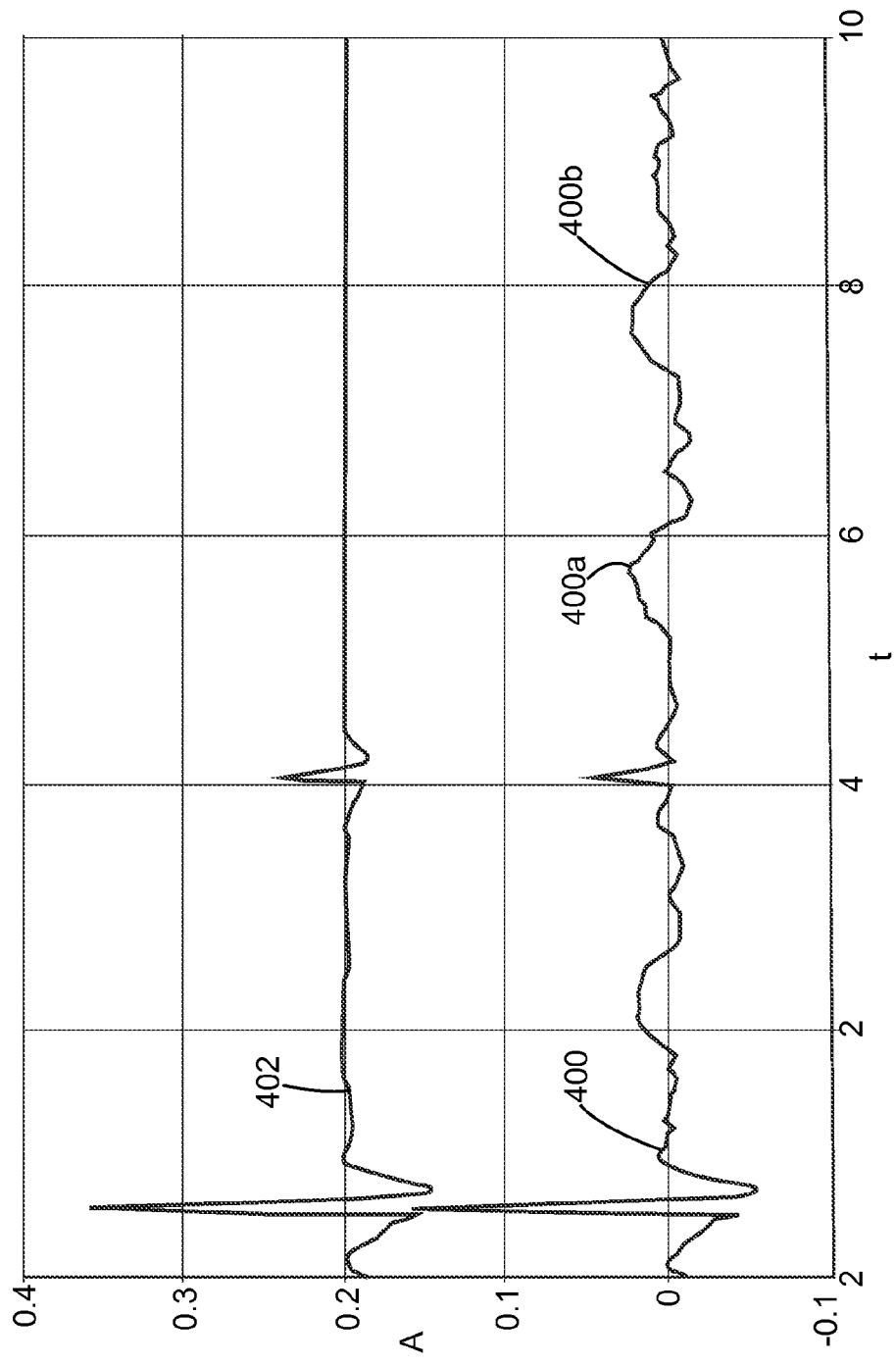
FIG. 4 is a graph illustrating earth responses with and without IMD noise when a source is driven by a first sweep according to an exemplary embodiment.
Figure 5:
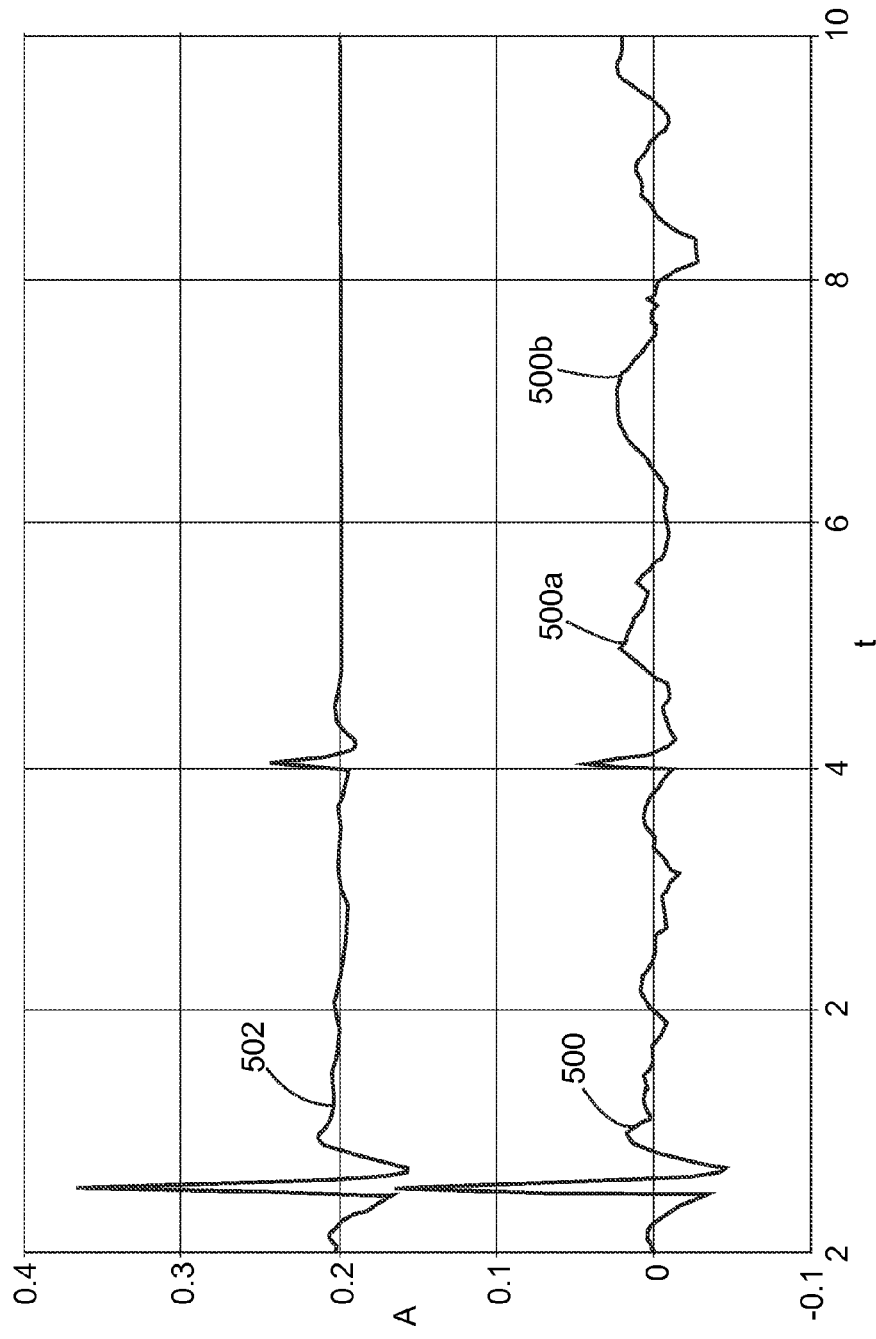
FIG. 5 is a graph illustrating earth responses with and without IMD noise when the source is driven by a second sweep according to an exemplary embodiment.

Both FIGS. 4 and 5 illustrate the earth responses in the time domain. The measured signals were converted to the frequency domain using a fast Fourier Transform (FFT) that is a discretized version of the Fourier transform better suited for calculations using digital computers. This means that after the earth responses were estimated based on equations (4) and (5), the artifacts of IMD distortion were calculated using a process described below and then subtracted in the frequency domain and that result was then transformed back into the time domain using an inverse fast Fourier transform (IFFT). Thus, the corrected data in the time domain is IMD corrected and further traditional processing may be applied to generate an image of the surveyed subsurface.

Initial estimates of the IMD source noise artifacts in h1est and h2est, called noise1 and noise2 respectively, may be formed, in one embodiment, as follows. A cosine taper window operator "W(t)" with values $W_t$ that are zero for times outside the listen time and unity during most of the listen time may be used. The cosine taper window operator may have smooth tapers for a short interval as the function tapers up from zero to unity at its start and then tapers down to zero as approaches the listen time:

$$Wh1est_t = W_t[h1est_t] \quad (7)$$

$$Wh2est_t = W_t[h2est_t]. \quad (8)$$

The noise terms may then be written as:

$$\text{noise1}_t = h1est_t - Wh1est_t \quad (9)$$

$$\text{noise2}_t = h2est_t - Wh2est_t \quad (10)$$

$$\text{NOISE1} = \text{FFT}\{\text{noise2}\} \quad (11)$$

$$\text{NOISE2} = \text{FFT}\{\text{noise1}\} \quad (12)$$

$$\text{have} = [h1est_t + h2est_t]/2 \quad (13)$$

$$\text{HAVE} = \text{FFT}\{\text{have}\} \quad (14)$$

$$D_f = \text{HAVE}_f(\overline{\text{HAVE}_f}) / \{\text{HAVE}_f(\overline{\text{HAVE}_f}^*) + \epsilon\} \quad (15).$$

So basically noise1 and noise2 are comprised of all the artifacts contained in the deconvolved records h1est and h2est that lie outside of the listen time for the deconvolved record. Additionally an averaged estimate of the earth response called "have" is formed by combining h1est and h2est as shown in equation (13) with its frequency domain representation HAVE shown in equation (14). Finally "D" is an array in the frequency domain useful for approximating H(f)/H(f)* where "s" is a very small number used to stabilize the spectral division.

Now, the fact that IMD1 an IMD2 are time-flipped versions of one another may be exploited as follows. The reverse noise terms RNOISE1 and RNOISE2 in the deconvolved records are formed in the frequency domain as shown in equations (16) and (17). Those frequency domain arrays RNOISE1 and RNOISE2 are then inverse FFT'd to form their time domain representations arrays rnoise1 and rnoise2.

$$RNOISE1_f = (NOISE1_f^*)D_f \quad (16)$$

$$RNOISE2_f = (NOISE2_f^*)D_f \quad (17)$$

$$rnoise1 = IFFT\{RNOISE1\} \quad (18)$$

$$rnoise2 = IFFT\{RNOISE1\} \quad (19)$$

Optional steps:

$$\text{for } 0 < t < LT \; rnoise1_t = noise2_t \quad (20)$$

$$\text{for } 0 < t < LT \; rnoise2_t = noise1_t \quad (21)$$

The optional steps shown in equations (20) and (21) replace the zero values that are due to the listen time window mute that was applied earlier and ultimately will affect only negative time (noncausal) portion of the earth transfer function estimate which is typically muted anyway. Thus, the reverse time noise artifact estimates can now be used to remove IMD noise artifacts in the causal part of the earth impulse response. In equations (22) and (23) there is a revised estimate of the earth impulse response for each of the two records, hAest and hBest.

$$hAest_t = h1est_t - rnoise2_t \quad (22)$$

$$hBest_t = h2est_t - rnoise1_t \quad (23)$$

Figure 6:
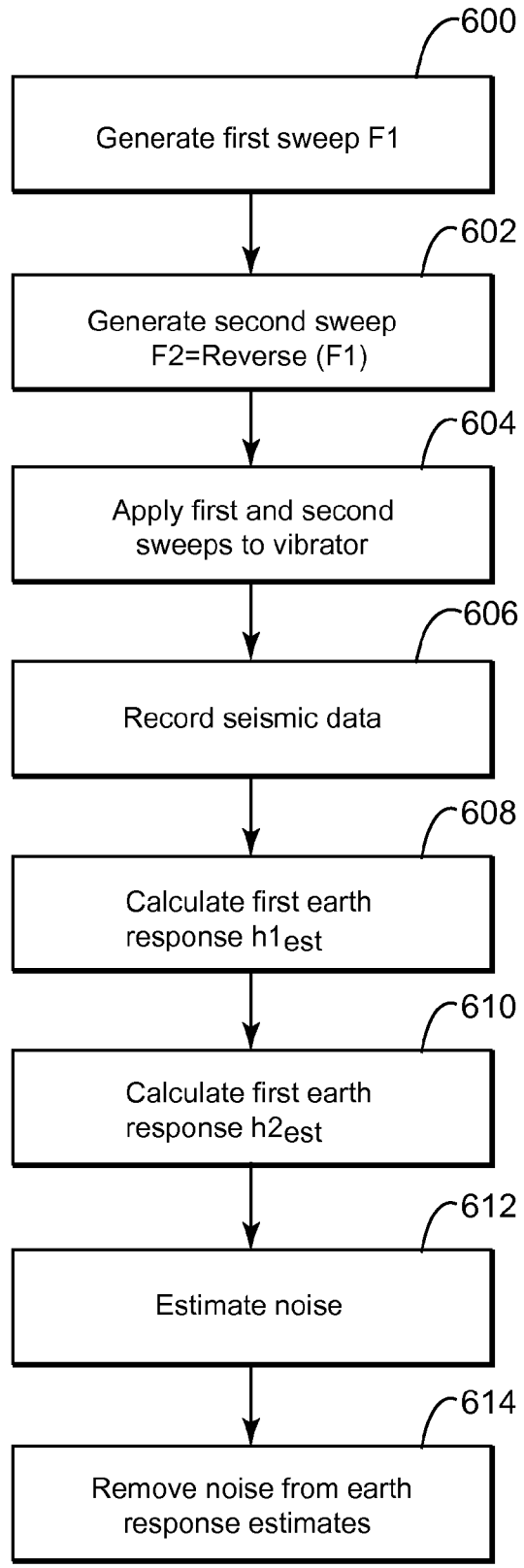
FIG. 6 is a flowchart illustrating a method for removing IMD noise from recorded seismic data according to an exemplary embodiment.

To summarize the novel method disclosed above, the following exemplary embodiment schematically illustrates the steps to be performed for designing a pilot signal and for removing the IMD noise from the recorded deconvolved data. As illustrated in FIG. 6, in step 600, a first sweep F1 is generated. The sweep F1 may be a sine function, or a pseudo-random sweep, etc. In step 602, a second sweep F2 is generated. The second sweep F2 may be of the same type as the first sweep F1. The first sweep may be a forward sequence while the second sweep may be a reverse sequence. However, the second sweep F2 is generated such that it is a time reverse of the first sweep F1. In step 604, the first and second sweeps are applied to one or more vibrators. In one application, the first sweep F1 is applied first and then the second sweep F2 is applied second. The energy imparted to the earth by the vibrators is recorded in step 606.

In step 608, a first earth response h1est is calculated based on a measured first force applied by the vibratory source to the ground (due to the first sweep F1) and in step 610 a second earth response h2es$_t$ is calculated based on a measured second force applied by the vibratory source to the ground (due to the second sweep F2). The earth responses are calculated in the frequency domain. These calculations take into account the fact that IMD products that occur in positive (causal) time for one record will be in negative (noncausal) time for the other record and vice versa. The noise in the negative time, where there is no seismic signal present, can be used as a model for the noise in the positive time for the second record and vice versa. In the frequency domain, the time reversal looks like a complex conjugate operation on the spectral data. Using this fact, it is possible to design noise estimates in the frequency domain, and reverse them in the time domain in step 612. Then, after an inverse Fourier transform IFFT is applied, it is possible to subtract the noise estimate from the earth response estimates in the time domain in step 614 to provide revised earth response estimates with IMD artifacts removed/mitigated.

Figure 7:
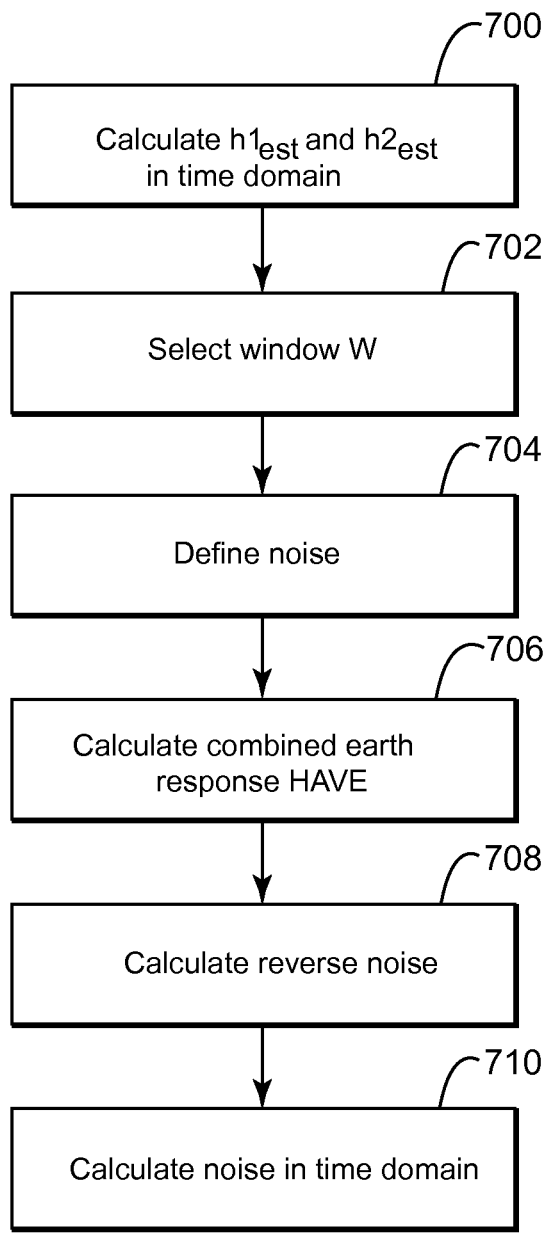
FIG. 7 is a flowchart illustrating how to calculate the IMD noise according to an exemplary embodiment.

Step 612 of estimating the noise is now discussed in more details with regard to FIG. 7. The earth responses H1est and H2est have been calculated in steps 608 and 610 in the frequency domain. The earth responses in the frequency domain are transformed back to the time domain to obtain h1est and h2est in step 700. A window function W is selected in step 702 and applied to the earth responses h1est and h2est to obtain the windowed earth responses Wh1est and Wh2est. A noise outside the window W in the time domain is defined in step 704 for each sweep, i.e., noise1=h1est−Wh1est and noise2=h2est−Wh2est, in the time domain. The earth response estimates, h1est and h2est in the time domain are then combined to form "have" which is then transformed into the frequency domain with a Fourier transform to form a combined earth response called HAVE is defined in step 706.

Reverse noise estimates rnoise1 and rnoise2 are calculated in step 708 by multiplying the complex conjugate of the noises in the frequency domain with the filter "D", where ideally D(f)=H(f)/H(f)* but is approximated using the calculation shown HAVE$_f$ as shown in equation (15); e.g., RNOISE1$_f$=(NOISE1$_f$)*. D$_f$ and RNOISE2$_f$=(NOISE2$_f$)*. D$_f$. In step 710, the reverse noises are transformed in the time domain to obtain the IMD noise artifact for each sweep and this noise is then used in step 614 to remove it from the earth response data in the time domain.

Optionally, the method may include a step of removing from the seismic data the intermodulation noise to obtain noise free seismic data and a step of generating an image of a surveyed subsurface based on the noise free seismic data.

Figure 8:
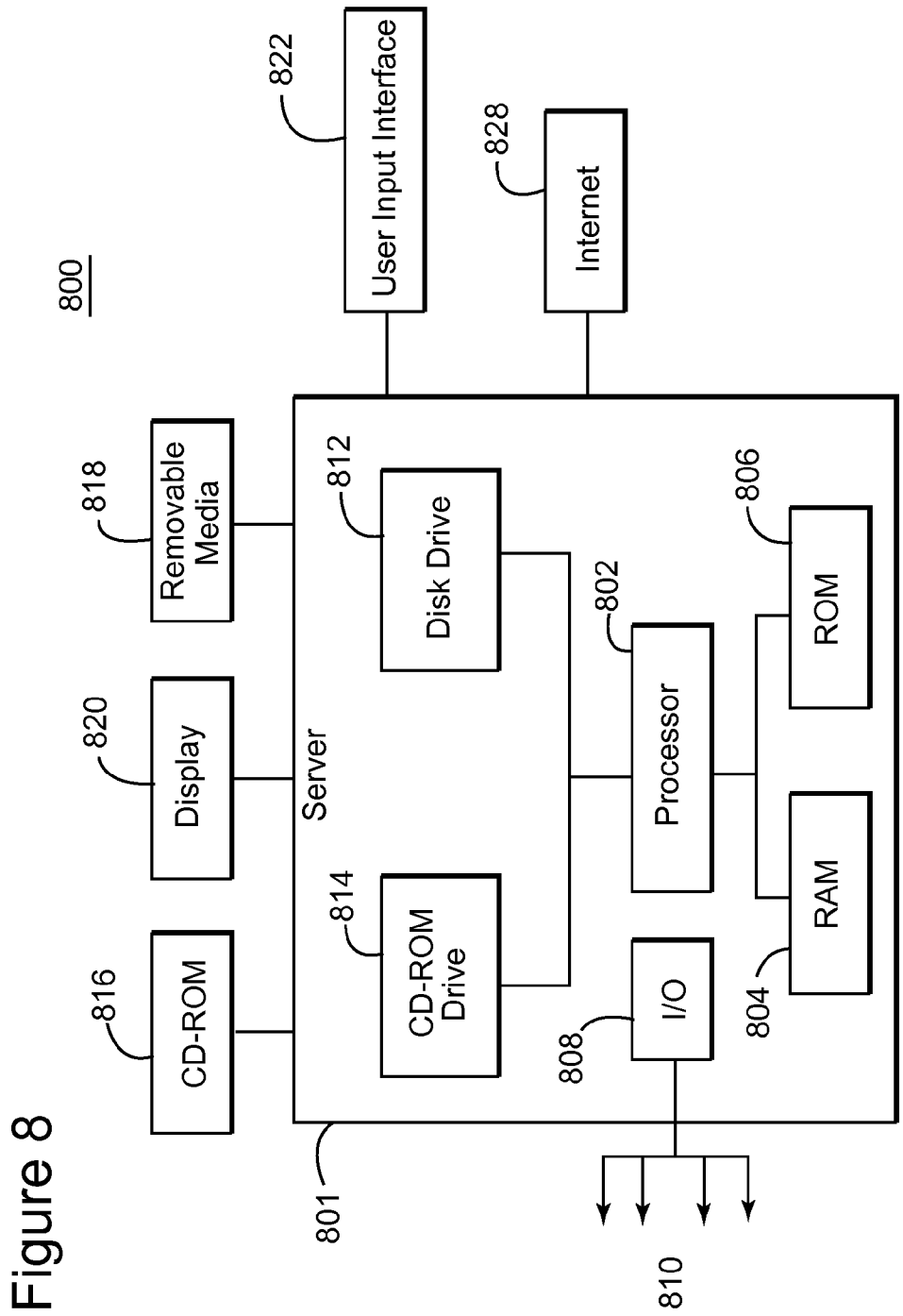
FIG. 8 is a schematic diagram of a computing device.

One or more of the steps of the above methods may be implemented in a computing system specifically configured to calculate the IMD noise. An example of a representative computing system capable of carrying out operations in accordance with the exemplary embodiments is illustrated in FIG. 8. Hardware, firmware, software or a combination thereof may be used to perform the various steps and operations described herein. The computing system may be one of elements 126, 128 and 129 or may be implemented in one or more of these elements.

The exemplary computing system 800 suitable for performing the activities described in the exemplary embodiments may include server 801. Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as is known in the art, as dictated by software and/or firmware instructions.

The server 801 may also include one or more data storage devices, including a hard drive 812, CD-ROM drives 814, and other hardware capable of reading and/or storing information such as DVD, etc. In one embodiment, software for carrying out the above discussed steps may be stored and distributed on a CD-ROM 816, removable memory device 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD displays, LED displays, plasma display, cathode ray tubes (CRT), etc. A user input interface 822 is provided, including one or more user interface mechanisms such as a mouse, keyboard, microphone, touch pad, touch screen, voice-recognition system, etc.

The server 801 may be coupled to other computing devices, such as the landline and/or wireless terminals via a network. The server may be part of a larger network configuration as in a global area network (GAN) such as the Internet 828, which allows ultimate connection to the various landline and/or mobile client devices. The computing device may be implemented on a vehicle that performs a land seismic survey.

The disclosed exemplary embodiments provide a system and a method for actuating sources asynchronously. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating intermodulation noise generated with one or more land seismic sources, the method comprising:
    receiving seismic data generated by actuating the one or more land seismic source with a first sweep and a second sweep;
    calculating with a computing device a first earth response (h1est) corresponding to the first sweep;
    calculating with the computing device a second earth response (h2est) corresponding to the second sweep; and
    calculating the intermodulation noise (IMD) based on the first and second earth responses (h1est, h2est);
    removing from the seismic data the intermodulation noise (IMD); and
    generating an image of a surveyed subsurface based on the seismic data, from which the intermodulation noise (IMD) has been removed, for identifying geophysical structures,
    wherein the second sweep is a time reverse sweep of the first sweep.

2. The method of claim 1, wherein the first and second sweeps are pseudo-random sweeps.

3. The method of claim 1, wherein the step of calculating the intermodulation noise comprises:
    calculating a combined earth response based on a sum of the first and second earth responses.

4. The method of claim 1, wherein the step of calculating the first earth response comprises:
    calculating the first earth response (H1est) in a frequency domain based on a first measured force (F1) produced by the first sweep and a second measured force (F2) produced by the second sweep.

5. The method of claim 4, wherein the step of calculating the second earth response comprises:
    calculating the second earth response (H2est) in a frequency domain based on the first measured force (F1) produced by the first sweep and the second measured force (F2) produced by the second sweep.

6. The method of claim 5, further comprising:
    calculating first and second intermodulation noise artifacts (noise1, noise2) based on the first earth response (h1est) and the second earth response (h2est); and
    calculating a filter D based on the first earth response (h1est) and the second earth response (h2est).

7. The method of claim 6, further comprising:
    calculating first and second reverse noise terms (rnoise1, rnoise2) based on the first and second intermodulation noise artifacts (noise1, noise2) and the filter D.

8. The method of claim 7, further comprising:
    removing from the received seismic data first and second reverse noise terms (rnoise1, rnoise2) to obtain noise mitigated seismic data.

9. The method of claim 8, further comprising:
    generating the image of the surveyed subsurface based on the noise mitigated seismic data.

10. A computing device for calculating intermodulation noise generated with one or more land seismic sources, the computing device comprising:
    an interface for receiving seismic data generated by actuating the one or more land seismic source with a first sweep and a second sweep; and
    a processor connected to the interface and configured to,
    calculate a first earth response (h1est) corresponding to the first sweep,
    calculate a second earth response (h2est) corresponding to the second sweep,
    calculate the intermodulation noise (IMD) based on the first and second earth responses (h1est, h2est),
    remove from the seismic data the intermodulation noise (IMD); and
    generate an image of a surveyed subsurface based on the seismic data, from which the intermodulation noise (IMD) has been removed, for identifying geophysical structures,
    wherein the second sweep is a time reverse sweep of the first sweep.

11. The computing device of claim 10, wherein the first and second sweeps are pseudo-random sweeps.

12. The computing device of claim 10, wherein the processor is further configured to:
    calculate a combined earth response based on a sum of the first and second earth responses.

13. The computing device of claim 10, wherein the processor is further configured to:
    calculate the first earth response (H1est) in a frequency domain based on a first measured force (F1) produced by the first sweep and a second measured force (F2) produced by the second sweep.

14. The computing device of claim 13, wherein the processor is further configured to:
    calculate the second earth response (H2est) in a frequency domain based on the first measured force (F1) produced by the first sweep and the second measured force (F2) produced by the second sweep.

15. The computing device of claim 14, wherein the processor is further configured to:
calculate first and second intermodulation noise artifacts (noise1, noise2) based on the first earth response (h1est) and the second earth response (h2est); and
calculate a filter D based on the first earth response (h1est) and the second earth response (h2est).

16. The computing device of claim 15, wherein the processor is further configured to:
calculate first and second reverse noise terms (rnoise1, rnoise2) based on the first and second intermodulation noise artifacts (noise1, noise2) and the filter D.

17. The computing device of claim 16, further comprising:
remove from the received seismic data first and second reverse noise terms (rnoise1, rnoise2) to obtain noise mitigated seismic data.

18. The computing device of claim 17, further comprising:
generate the image of the surveyed subsurface based on the noise mitigated seismic data.

19. A non-transitory computer readable medium including computer executable instructions, wherein the instructions, when executed by a computer, implement a method for calculating intermodulation noise generated with one or more land seismic sources, the method comprising:
receiving seismic data generated by actuating the one or more land seismic source with a first sweep and a second sweep;
calculating with a computing device a first earth response (h1est) corresponding to the first sweep;
calculating with the computing device a second earth response (h2est) corresponding to the second sweep;
calculating the intermodulation noise (IMD) based on the first and second earth responses (h1est, h2est),
removing from the seismic data the intermodulation noise (IMD); and
generating an image of a subsurface based on the seismic data, from which the intermodulation noise (IMD) has been removed, for identifying geophysical structures,
wherein the second sweep is a time reverse sweep of the first sweep.

20. The medium of claim 19, wherein the first and second sweeps are pseudo-random sweeps.

\* \* \* \* \*